(12) United States Patent
Taylor et al.

(10) Patent No.: US 10,162,713 B2
(45) Date of Patent: Dec. 25, 2018

(54) PERSISTENT APPLICATION ACTIVATION AND TIMER NOTIFICATIONS

(71) Applicant: Microsoft Technology Licensing, LLC, Redmond, WA (US)

(72) Inventors: John A. Taylor, Bellevue, WA (US); Nicholas A. Allen, Redmond, WA (US); Stuart J. Langley, Redmond, WA (US); Igor Sedukhin, Issaquah, WA (US); Justin D. Brown, Seattle, WA (US); Kartik Paramasivam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/625,791

(22) Filed: Feb. 19, 2015

(65) Prior Publication Data

US 2015/0161014 A1 Jun. 11, 2015

Related U.S. Application Data

(63) Continuation of application No. 12/688,628, filed on Jan. 15, 2010.

(51) Int. Cl.
*G06F 11/00* (2006.01)
*G06F 11/14* (2006.01)
(Continued)

(52) U.S. Cl.
CPC .......... *G06F 11/1469* (2013.01); *G06F 9/485* (2013.01); *G06F 11/2046* (2013.01); *G06F 11/1438* (2013.01); *G06F 11/2041* (2013.01)

(58) Field of Classification Search
CPC ............. G06F 2201/88; G06F 11/0757; G06F 11/1438; G06F 9/465; G06F 11/142;
(Continued)

(56) References Cited

U.S. PATENT DOCUMENTS

| 4,639,864 A | 1/1987 | Katzman et al. |
| 5,027,269 A * | 6/1991 | Grant .................... G06F 11/142 709/224 |

(Continued)

FOREIGN PATENT DOCUMENTS

| CN | 1276887 A | 12/2000 |
| CN | 101313278 A | 11/2008 |
| EP | 0981089 A2 | 2/2000 |

OTHER PUBLICATIONS

Chappell, David, "Workflows, Services, and Models", Oct. 2008, 17 pages.

(Continued)

*Primary Examiner* — Loan L. T. Truong

(57) ABSTRACT

The present invention extends to methods, systems, and computer program products for persistent application activation and timer notifications. A durable instance manager, instance execution hosts, and an instance store interoperate to transition instances between executing and persisted states. System properties are associated with an instance. System properties can define re-activation conditions, that when satisfied, indicate that an instance is to be re-activated for execution. System properties can define timers as well as indications that instances are in a persisted but ready to run state.

21 Claims, 6 Drawing Sheets

(51) Int. Cl.
*G06F 9/48* (2006.01)
*G06F 11/20* (2006.01)

(58) Field of Classification Search
CPC .. G06F 11/2023; G06F 11/2046; H04L 67/14;
H04L 67/142; H04L 69/40
See application file for complete search history.

(56) References Cited

U.S. PATENT DOCUMENTS

| | | | | |
|---|---|---|---|---|
| 5,283,856 | A * | 2/1994 | Gross | G06N 5/022 706/45 |
| 5,555,346 | A * | 9/1996 | Gross | G06N 5/022 706/11 |
| 5,627,764 | A * | 5/1997 | Schutzman | G06N 5/022 358/402 |
| 5,832,283 | A * | 11/1998 | Chou | G06F 1/3203 713/1 |
| 5,908,470 | A * | 6/1999 | Stonecypher, Jr. | G06F 9/4825 713/502 |
| 6,061,807 | A * | 5/2000 | Albert | H04L 69/40 714/2 |
| 6,083,280 | A * | 7/2000 | Eitel | H04M 3/51 717/158 |
| 6,105,148 | A | 8/2000 | Chung et al. | |
| 6,195,760 | B1 | 2/2001 | Chung et al. | |
| 6,339,584 | B1 * | 1/2002 | Gross | H04L 12/40026 370/225 |
| 6,477,663 | B1 | 11/2002 | Laranjeira et al. | |
| 6,629,260 | B1 * | 9/2003 | Dancer et al. | 714/3 |
| 6,873,987 | B1 | 3/2005 | Novaes | |
| 6,901,405 | B1 * | 5/2005 | McCrady | G06F 17/30595 |
| 6,959,401 | B2 | 10/2005 | Lomet | |
| 7,089,585 | B1 * | 8/2006 | Dharmarajan | H04L 63/0815 370/312 |
| 7,225,244 | B2 | 5/2007 | Reynolds et al. | |
| 7,284,149 | B1 | 10/2007 | Fisher et al. | |
| 7,313,727 | B2 | 12/2007 | Cabrera et al. | |
| 7,340,314 | B1 | 3/2008 | Duncan et al. | |
| 7,383,549 | B1 * | 6/2008 | Draganic | H04L 12/12 375/219 |
| 7,421,478 | B1 * | 9/2008 | Muchow | G06F 9/44505 709/209 |
| 7,444,536 | B1 * | 10/2008 | Jairath | G06F 9/465 714/4.11 |
| 7,565,383 | B2 | 7/2009 | Gebhart et al. | |
| 7,565,567 | B2 | 7/2009 | Ross | |
| 7,661,027 | B2 | 2/2010 | Langen et al. | |
| 7,702,957 | B2 * | 4/2010 | Shinn | G06F 11/0757 714/38.1 |
| 7,954,062 | B2 | 5/2011 | Bright et al. | |
| 7,961,701 | B2 | 6/2011 | Wherry et al. | |
| 7,979,864 | B2 | 7/2011 | Meguro | |
| 8,046,731 | B2 * | 10/2011 | Sabev | G06F 9/4825 709/212 |
| 8,066,559 | B2 | 11/2011 | Kamath et al. | |
| 8,099,257 | B2 | 1/2012 | Parvin et al. | |
| 8,151,278 | B1 * | 4/2012 | Knee | H04L 69/28 709/241 |
| 8,424,009 | B2 | 4/2013 | Allen et al. | |
| 8,443,379 | B2 * | 5/2013 | Dar | G06F 9/526 719/314 |
| 8,468,390 | B2 * | 6/2013 | Callaway et al. | 714/15 |
| 8,490,103 | B1 | 7/2013 | Belady et al. | |
| 8,499,298 | B2 | 7/2013 | Mitchell et al. | |
| 8,510,596 | B1 * | 8/2013 | Gupta | G06F 11/073 714/15 |
| 8,510,755 | B2 | 8/2013 | Paramasivam et al. | |
| 9,846,597 | B2 * | 12/2017 | Abbas | G06F 9/50 |
| 2002/0040314 | A1 * | 4/2002 | Tolson | G06F 3/0486 709/224 |
| 2002/0120924 | A1 | 8/2002 | Miloushev | |
| 2002/0126812 | A1 * | 9/2002 | Majewski | H04M 3/22 379/114.03 |
| 2002/0152422 | A1 | 10/2002 | Sharma et al. | |
| 2003/0172368 | A1 | 9/2003 | Alumbaugh et al. | |
| 2003/0204647 | A1 * | 10/2003 | Jacobs | G06F 9/465 719/330 |
| 2004/0045008 | A1 * | 3/2004 | June | G06F 9/465 719/316 |
| 2004/0153712 | A1 | 8/2004 | Owhadi et al. | |
| 2005/0015643 | A1 * | 1/2005 | Davis et al. | 714/4 |
| 2005/0044566 | A1 | 2/2005 | Jerding et al. | |
| 2005/0049973 | A1 | 3/2005 | Read et al. | |
| 2005/0054381 | A1 * | 3/2005 | Lee | G06F 3/011 455/557 |
| 2005/0097553 | A1 | 5/2005 | Smith et al. | |
| 2005/0108593 | A1 | 5/2005 | Purushothaman et al. | |
| 2005/0132250 | A1 | 6/2005 | Hansen et al. | |
| 2005/0226202 | A1 * | 10/2005 | Zhang | H04L 47/245 370/349 |
| 2005/0235294 | A1 * | 10/2005 | Kimura et al. | 719/328 |
| 2005/0273674 | A1 * | 12/2005 | Shinn | G06F 11/0718 714/55 |
| 2006/0085166 | A1 * | 4/2006 | Ochi | G06F 11/3495 702/186 |
| 2006/0156072 | A1 * | 7/2006 | Khot | G06F 11/3612 714/47.2 |
| 2006/0184535 | A1 | 8/2006 | Kaluskar et al. | |
| 2006/0218429 | A1 | 9/2006 | Sherwin, Jr. et al. | |
| 2006/0294417 | A1 * | 12/2006 | Awasthi | G06F 11/2023 714/10 |
| 2007/0118530 | A1 | 5/2007 | Chow et al. | |
| 2007/0143444 | A1 * | 6/2007 | Kamiya | H04L 63/101 709/219 |
| 2007/0156486 | A1 | 7/2007 | Sanabria et al. | |
| 2007/0288481 | A1 | 12/2007 | Shinn et al. | |
| 2007/0288526 | A1 | 12/2007 | Mankad et al. | |
| 2008/0075419 | A1 * | 3/2008 | Okubo | G11B 27/002 386/332 |
| 2008/0118047 | A1 | 5/2008 | Nachum | |
| 2009/0037676 | A1 * | 2/2009 | Coronado | G06F 11/2069 711/162 |
| 2009/0049443 | A1 | 2/2009 | Powers et al. | |
| 2009/0063270 | A1 | 3/2009 | Bengtsson et al. | |
| 2009/0067835 | A1 * | 3/2009 | Chen | H04J 3/14 398/45 |
| 2009/0180412 | A1 * | 7/2009 | Albert | H04W 52/0229 370/311 |
| 2009/0320044 | A1 * | 12/2009 | Dar | G06F 9/546 719/314 |
| 2010/0049721 | A1 | 2/2010 | Anderson et al. | |
| 2010/0064130 | A1 * | 3/2010 | Borisov | H04L 67/14 713/151 |
| 2010/0205263 | A1 * | 8/2010 | Langen | G06F 11/2028 709/206 |
| 2010/0218030 | A1 * | 8/2010 | Bhatnagar | G06F 11/0748 714/2 |
| 2010/0287544 | A1 * | 11/2010 | Bradfield et al. | 717/172 |
| 2010/0318616 | A1 | 12/2010 | Langley et al. | |
| 2010/0319006 | A1 * | 12/2010 | Allen et al. | 719/318 |
| 2011/0154270 | A1 * | 6/2011 | Sonoda | H04N 5/781 715/867 |
| 2011/0179303 | A1 * | 7/2011 | Taylor | G06F 9/485 714/4.11 |
| 2012/0030169 | A1 * | 2/2012 | Allen | G06F 17/30345 707/627 |
| 2013/0125240 | A1 | 5/2013 | Xu et al. | |
| 2013/0263127 | A1 * | 10/2013 | y Arcas | G06F 9/455 718/1 |
| 2014/0351832 | A1 * | 11/2014 | Cho | H04L 67/141 719/328 |

OTHER PUBLICATIONS

Chinese 1st Office Action in Application 201080061445.0, dated May 27, 2014, 11 pgs.
Chinese Notice of Allowance in Application 201080061445.0, dated Nov. 6, 2014, 4 pgs.

(56) References Cited

OTHER PUBLICATIONS

Dearle, Alan, "Operating System Support for Persistent Systems: Past, Present and Future", Based on information and belief available, at least as early as Oct. 5, 2009, 38 pages.
PCT International Search Report dated Aug. 30, 2011, issued in International Application No. PCT/US2010/062657, 9 pgs.
Pei, Dan, et al., "Design and Implementation of a Low-Overhead File Checkpointing Approach", 2000, 3 pages.
Riteau, Pierre, et al., "Handling Persistent States in Process Checkpoint/ Restart Mechanisms for HPC Systems", Dec. 2008, 19 pages.
U.S. Appl. No. 12/688,628, Amendment and Response filed Jan. 6, 2015, 16 pgs.
U.S. Appl. No. 12/688,628, Amendment and Response filed Dec. 26, 2013, 15 pgs.
U.S. Appl. No. 12/688,628, Notice of Allowance dated Mar. 14, 2014, 8 pgs.
U.S. Appl. No. 12/688,628, Office Action dated Oct. 6, 2014, 19 pgs.
U.S. Appl. No. 12/688,628, Office Action dated Sep. 25, 2013, 19 pgs.
Wang, Yi-Min, et al., "Checkpointing and Its Applications", in Proc, IEEE Fault-Tolerant Computing Symp, (FTCS-25), Jun. 1995, pp. 22-31.
"Final Office Action Issued in U.S. Appl. No. 12/688,628", dated May 18, 2015, 17 Pages.
"First Office Action and Search Report Issued in Chinese Patent Application No. 201510028002.6", dated Jun. 30, 2017, 12 Pages.
"Supplementary Search Report Issued in European Patent Application No. 10843615.5", dated Dec. 20, 2017, 14 Pages.
"Second Office Action Issued in Chinese Patent Application No. 201510028002.6", dated Feb. 24, 2018, 7 Pages.
European Office Action in Application 10843615.5, dated Sep. 14, 2018, 10 pages.
Chinese 3rd Office Action in Application 201510028002.6, dated Sep. 4, 2018, 6 pgs.

\* cited by examiner

PERSISTENT APPLICATION ACTIVATION AND TIMER NOTIFICATIONS

CROSS-REFERENCE TO RELATED APPLICATIONS

This application is a Continuation of, and priority is claimed to, U.S. patent application Ser. No. 12/688,628, filed Jan. 15, 2010, entitled "PERSISTENT APPLICATION ACTIVATION AND TIMER NOTIFICATIONS," which application is incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Long-running (e.g., hours, days, or even months) applications, such as, for example, workflow applications, often benefit from periodically persisting their work to allow for the application to recover after errors, crashes, or machine failures. Persisting work can include moving work from system memory to secondary (or other) more durable storage. Persisting work permits applications to temporarily go idle and have their resources (e.g., system memory) reassigned. To persist work, an application host coordinates the persisted state with runtime state to ensure that a consistent checkpoint is created. For example, the persisted state may need to coordinate with application transactions, message notifications, locks, local state caches, etc.

However, long-running applications may also need to be restarted at a later time. That is, a long-running application may need to be moved from more durable storage back into system memory. For example, an application may anticipate receipt of a message at a designated time after being persisted to durable storage. For the application to appropriately receive the message, the application may need to be loaded into system memory prior to the message arriving. Alternately, a host execution environment can fail, resulting in the need to restart an application in another execution environment.

BRIEF SUMMARY

The present invention extends to methods, systems, and computer program products for persistent application activation and timer notifications. Embodiments of the invention include restarting an application instance, such as, for example, due to a timer firing or due to an execution host for the application instance being shut down or failing. In some embodiments, a first instance execution host, from among the one or more instance execution hosts, executes an application instance representing a portion of an application. It is determined that the application instance is to be dormant for some amount of time before further processing of the application instance occurs.

A system property is persisted in an instance store for the application instance. The system property contains information indicating that the application instance is to be subsequently re-activated for execution. A second instance execution host, from among the one or more instance execution hosts, registers with the durable instance manager an interest in receiving event notifications regarding application instances to re-activate. The second instance execution host receives an event notification to re-activate the application instance. The event notification is responsive to the information contained in the system property persisted in the instance store and registration with the durable instance manager. The application instance is loaded at the second instance execution host in response to receiving the event notification to further process the application instance.

In other embodiments, a durable instance manager monitors execution of an application instance at an instance execution host. The durable instance manager receives an indication that the application instance is to be subsequently re-activated at an instance execution host at a future time. The durable instance manager persists a system property corresponding to the application instance at the instance store. The system property contains information defining a re-activation condition that, when satisfied, is an indication that the application instance is to be re-activated for execution The durable instance manager detects an event that satisfies the re-activation condition subsequent to persisting the system property corresponding to the application instance. The durable instance manager receives registration requests from one or more instance execution hosts for interest in receiving event notifications regarding application instances to re-activate. The durable instance manager sends an event notification to a further instance execution host to re-activate the application instance for execution. The event notification is responsive to detection of the event that satisfies the re-activation condition and the registration from the instance execution host.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not

DETAILED DESCRIPTION

Figure 1A:
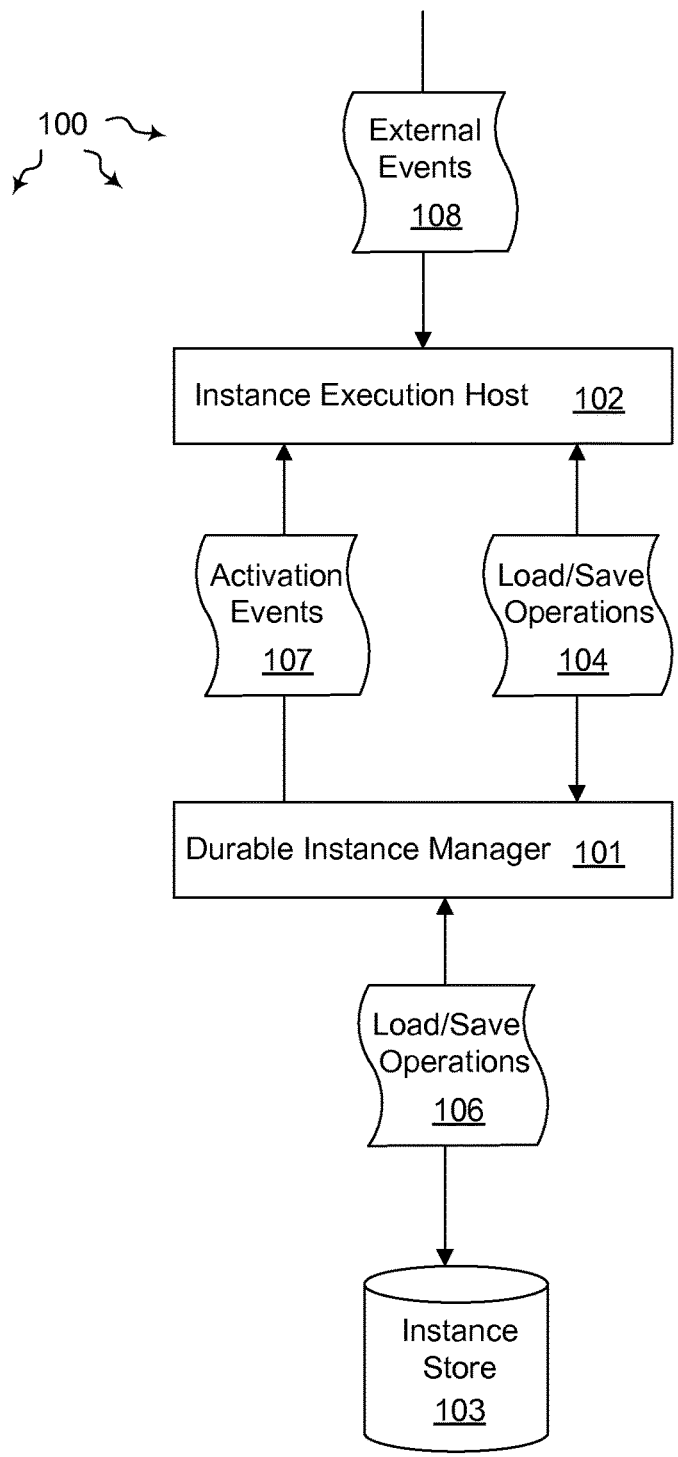
FIG. 1A illustrates an example computer architecture that facilitates restarting an instance.

The present invention extends to methods, systems, and computer program products for persistent application activation and timer notifications Embodiments of the invention include restarting an application instance, such as, for example, due to a timer firing or due to an execution host for the application instance being shut down or failing. In some embodiments, a first instance execution host, from among the one or more instance execution hosts, executes an application instance representing a portion of an application. It is determined that the application instance is to be dormant for some amount of time before further processing of the application instance occurs.

A system property is persisted in an instance store for the application instance. The system property contains information indicating that the application instance is to be subsequently re-activated for execution. A second instance execution host, from among the one or more instance execution hosts, registers with the durable instance manager an interest in receiving event notifications regarding application instances to re-activate. The second instance execution host receives an event notification to re-activate the application instance. The event notification is responsive to the information contained in the system property persisted in the instance store and registration with the durable instance manager. The application instance is loaded at the second instance execution host in response to receiving the event notification to further process the application instance.

In other embodiments, a durable instance manager monitors execution of an application instance at an instance execution host. The durable instance manager receives an indication that the application instance is to be subsequently re-activated at an instance execution host at a future time. The durable instance manager persists a system property corresponding to the application instance at the instance store. The system property contains information defining a re-activation condition that, when satisfied, is an indication that the application instance is to be re-activated for execution The durable instance manager detects an event that satisfies the re-activation condition subsequent to persisting the system property corresponding to the application instance. The durable instance manager receives registration requests from one or more instance execution hosts for interest in receiving event notifications regarding application instances to re-activate. The durable instance manager sends an event notification to a further instance execution host to re-activate the application instance for execution. The event notification is responsive to detection of the event that satisfies the re-activation condition and the registration from the instance execution host.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

FIG. 1A illustrates an example computer architecture 100 that facilitates restarting instances. Accordingly, computer architecture 100 can represent a distributed computing environment where a common application pattern takes the overall state of a system and breaks the overall state into discrete instances. Each instance represents a meaningful and, at least partially, autonomous unit of state and associated application logic. Computer architecture 100 also provides infrastructural support for managing instances in both an executing state and a persisted state.

An instance in an executing state is in system memory and using processor resources. An instance in a persisted state is dormant and moved (e.g., temporarily) to more durable (secondary) storage, such as, for example, to disk. Thus, within computer architecture 100, instances can move from a persisted state to an executing state as a result of an external stimulus (e.g., external events 108), such as the arrival of an application message from another system or as a result of internal events. Workflow is one example of a program execution technology that can be hosted and managed using both executing and persisted states.

As depicted, computer architecture 100 includes durable instance manager 101, instance execution host 102, and instance store 103. Each of the components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, instance execution host 102 contains the logic necessary for the in-memory runtime execution of the instance. Instance store 103 is configured to physically hold the data for instances that are in a persisted state. Durable instance manager 101 is situated logically between the instance execution host 102 and instance storage 103 and coordinates their interaction. Durable instance manager 101 receives load and save operation requests (load/save operations 104) from instance execution hosts 102 and forwards these (load/save operations 106) to instance store 103. Durable instance manager 101 is also configured to send internal activation events (e.g., activation events 107) to activate instance execution hosts to process specified instances.

Generally, if an event occurs and the applicable instance happens to be in memory in the executing state, then that event is directed to the instance by the instance execution host 102 and handled appropriately by the associated application code. However, if the event occurs and the instance is in a persisted state in instance store 103, instance execution host 102 sends a request to instance store 103 to load the applicable instance.

Durable instance manager 101 is configured to be aware of the state of instances in the system at any time, including whether an instance is executing in an instance execution host or is persisted in instance store 103. Durable instance manager 101 is also configured to be aware of which instance execution host an instance is executing at. Durable instance manager 101 is also configured to track the availability and state (as to what instance types are available) of the set of instance execution hosts.

As previously described, there are different sources for events, including internal and external. An example of an external event is the arrival of an application message at an instance execution host. For an external event, an instance execution host loads the instance and then gives it the message. The instance may then handle the event by updating its state and then starting to wait on another application event. In such a case the instance "goes idle". In response, the instance execution host attempts to unload or save idle instances. In order to avoid thrashing, an instance execution host may also wait for a time interval prior to unloading the instance.

Internal events include activation events. For example, based on monitoring, durable instance manager 101 can determines that a particular instance is to be running in an instance execution host. Durable instance manager 101 can then send activation events (e.g., activation events 107) to one of the instance execution hosts (e.g., instance execution host 102) it knows about.

Activation events may occur at one or more of two levels, at an instance type level and at the instance level. Generally, an instance type is the definition of the particular program code for the instance. On the other hand, an instance is the actual data for a particular instance. Type level activation can be integrated with hosting infrastructure in a different way than instance level activation. Durable instance manager 101 can send a type level event to make the instance type available. Then, once the type is available, durable instance manager 101 can send an instance level event to activate an instance.

Figure 2:
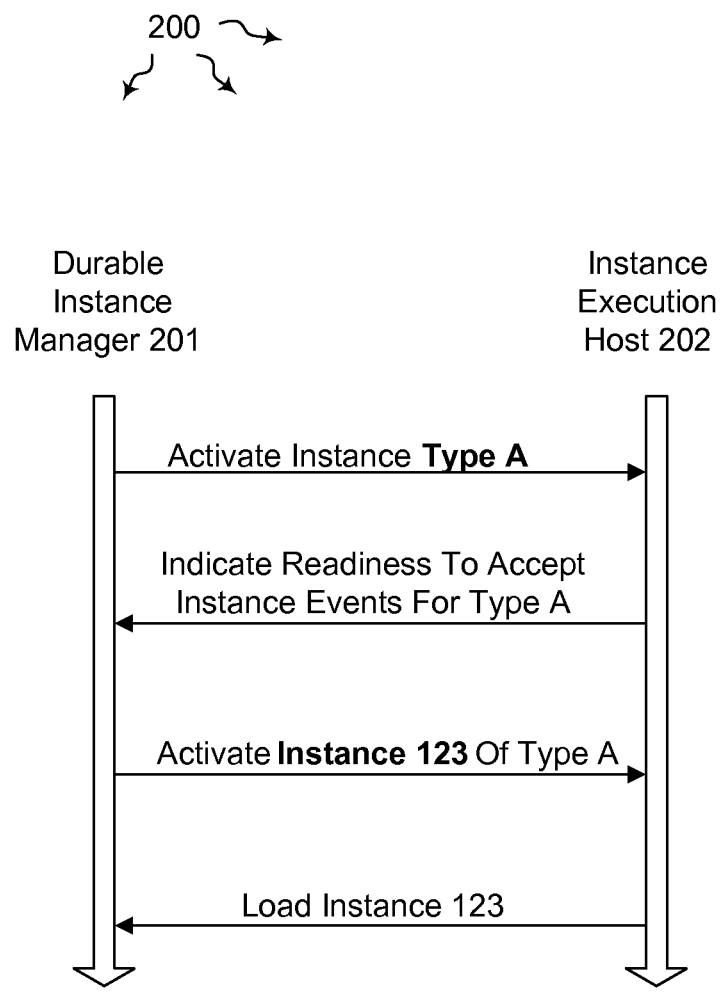
FIG. 2 illustrates a sequence diagram of instance activation.

FIG. 2 illustrates a sequence diagram 200 of instance activation. As depicted, durable instance manager 201 sends activate instance Type A to instance execution host 202. Instance execution host 202, returns an indication of readiness to accept instance events for instance Type A. Durable instance manager 201 then sends activate Instance 123 of Type A to instance execution host 202. Instance execution host 202 returns a load operation to durable instance manager 201. The load operation indicates that Instance 123 is to be loaded at instance execution host 202. Durable instance manager 201 can then load Instance 123 from durable storage to instance execution host 202, transitioning instance 123 to an executing state.

In some environments, there may be multiple instances of the same type. Thus, it may be beneficial for an instance execution host to be informed of activation in a normalized manner with two distinct event types. Two levels of activation may be appropriate when an instance execution host implements an optimization whereby types are only loaded on-demand First, the instance-type is made available by executing the type level activation. After that type is available, the instance execution host indicates this availability to the distributed instance manager and instance level activation events are sent to that particular host.

A durable instance manager can also keep track of the state of instance execution hosts. When the durable instance manager is aware of an instance execution host that has the appropriate type available, the durable instance manager can bypass the type level event and send the instance activation event directly to that host.

Embodiments of the invention can send activation events to an instance execution host in response to a variety of different re-activation conditions, including expiration of a timer, graceful shutdown of an instance execution host, and detected failure of an instance execution host. To facilitate appropriate re-activation of an instance, a system property can be stored along with the instance in instance store 103. The system property can define one or more conditions, which when satisfied, provide an indication of when the instance is to be re-activated for execution (i.e., transitioned to an executing state).

In some embodiments, an instance execution host associates a system property with an instance. For example, an instance execution host can determine that an instance is to be idle until a specified wake up time. In response, the instance execution host can associate the instance with a system property representing a timer. The instance execution host can then save the instance to durable storage. The timer can indicate the specified wake up time, the next time the instance is to be transitioned back to an executing state. A durable instance manager can monitor the system property and re-activate the instance at the specified wake up time (e.g., prior to receiving a next message). An instance execution host may define many timers, however a durable instance manager can appropriately re-activate an instance with knowledge of the next time.

Alternately, when an instance execution host is gracefully shutdown, the instance execution host unloads its currently executing instances. Instances are unloaded by interrupting execution and saving the instances to durable storage. The instance execution host can associate interrupted instances with a system property indicating that the instances are in a "Ready To Run" state. A durable instance manager can detect the property and attempt to re-activate "Ready To Run" instances (potentially in a load balanced way) across other instance execution hosts. Thus, a "Ready To Run" property can indicate that an application instance is to be re-activated either at the same execution host or at another different execution host.

Figure 1B:
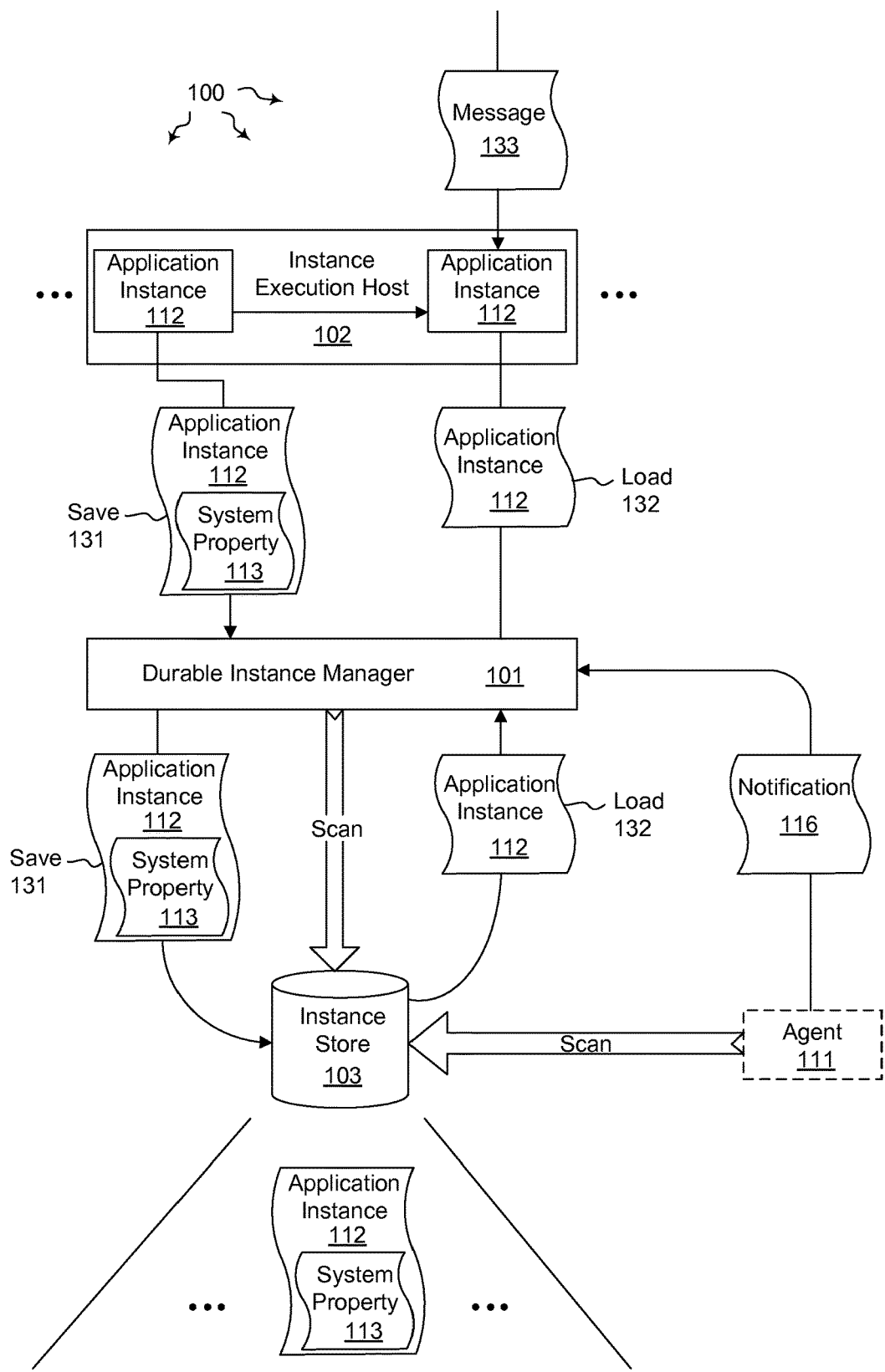
FIG. 1B illustrates another view of the example computer architecture of FIG. 1A.

FIG. 1B illustrates another view of computer architecture 100, wherein an instance execution host associates a system property with an instance that is to be re-activated.

As depicted in FIG. 1B, application instance 112 is executing at instance execution host 102. In response to detecting a period of dormancy for instance 112 or to a graceful shutdown of instance execution host 102, instance execution host 102 stores system property 113 (e.g., a timer or "Ready To Run" indication) in application instance 112. Instance execution host then sends save operation 131 to durable instance manager 101. Durable instance manager 101 in turn sends save operation 131 to instance store 103 to persist application instance 112 at instance store 103 (transitioning application instance 112 to a persisted state).

From time to time, durable instance manager 101 scans instance store 103 for instances that are to be re-activated based on a system property. Durable instance manager 101 can detect, based on system property 113, that application instance 112 is to be re-activated (e.g., when a wake up time is reached or application instance 112 is "Ready To Run"). Alternately, agent 111 can scan instance store 103 for instances that are to be re-activated based on a system property. Agent 111 can detect, based on system property 113, that application instance 112 is to be re-activated. In response, agent 111 can send notification 116 to durable instance manager 101. Notification 116 can indicate that application instance 112 is to be re-activated.

Durable instance manager 101 can then send load command 132 to re-activate application instance 112 at instance execution host 102. Instance execution host 102 can load application instance 112, transitioning application instance 112 to an executing state. Application instance 112 then continues to execute, such as, for example, processing message 133.

Alternately, durable instance manager 101 can re-activate application instance 112 at a different instance execution host, such as, for example, when instance execution host 102 was gracefully shutdown. To facilitate activation, durable instance manager 101 can initiate one or more of the levels of activation described in sequence diagram 200 with the different instance execution host.

In other embodiments, a durable instance manager associates a system property with an instance. A durable instance manager can be configured to monitor the connection between an instance execution host and the durable instance manager and configured to track the instances contained by (being executed at) an instance execution host. Generally, when the durable instance manager detects that a connection to an instance execution host has been dropped, the durable instance manager changes the state of all instances contained by the instance execution host to "Ready To Run". The durable instance manager can detect the property and attempt to re-activate "Ready To Run" instances (potentially in a load balanced way) across other instance execution hosts.

Figure 1C:
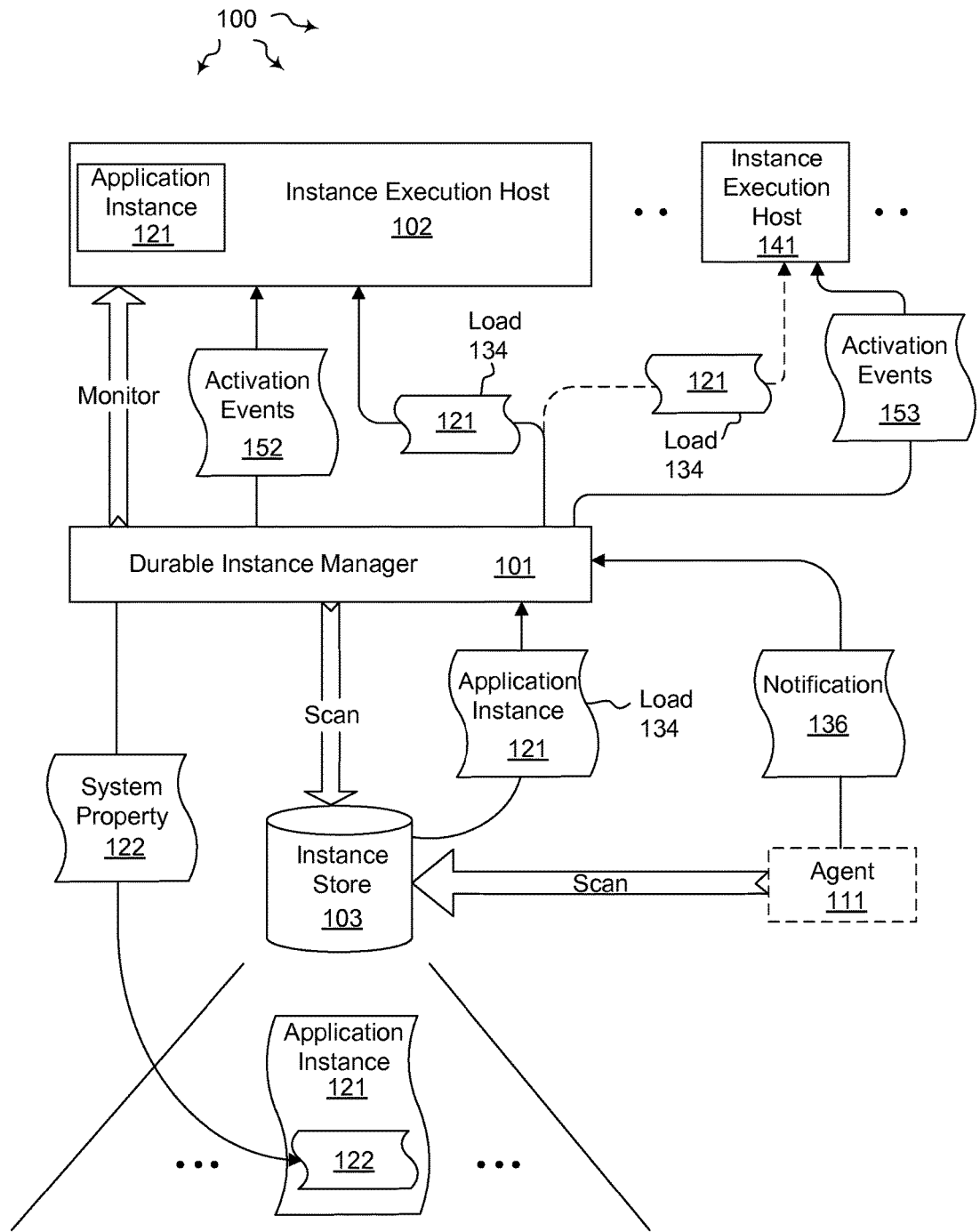
FIG. 1C illustrates another view of the example computer architecture of FIG. 1A.

FIG. 1C illustrates another view of computer architecture 100, wherein a durable instance manager associates a system property with an instance that is to be re-activated.

As depicted in FIG. 1C, application instance 121 is executing at instance execution host 102. Durable instance manager 101 monitors a connection between instance execution host 102 and durable instance manager 101. Durable instance manager 101 also tracks the instances contained by (being executed at) instance execution host 102. In response to detecting a dropped connection to instance execution host 102, durable instance manager 101 changes the state of all the instances contained by instance execution host 102 to a "Ready To Run" state.

For example, durable instance manager 101 can set system property 122 in application instance 121 persisted in instance store 103. System property 122 indicates that application instance 121 is in a "Ready To Run" state.

From time to time, durable instance manager 101 scans instance store 103 for instances that are to be re-activated based on a system property. Durable instance manager 101 can detect, based on system property 122 indicating a "Ready To Run" state, that application instance 121 is to be re-activated. Alternatively, agent 111 can scan instance store 103 for instances that are to be re-activated based on a system property. Agent 111 can detect, based on system property 122, that application instance 121 is to be re-activated. In response, agent 111 can send notification 136 to durable instance manager 101. Notification 136 can indicate that application instance 112 is to be re-activated.

Durable instance manager 101 can then attempt to activate a instance execution host to load application instance 121. To facilitate activation, durable instance manager 101 can initiate one or more of the levels of activation described in sequence diagram 200 for instance execution. For example, if a connection between instance execution host 102 and durable instance manager 101 is again detected, durable instance manager 101 can send activation events 152 to instance execution host 102. Alternately, durable instance manager 101 can send activation events 153 to instance execution host 141 (or to some other instance execution host).

Durable instance manager 101 can then send load command 134 to re-activate application instance 112 at the appropriate instance execution host (e.g., either 102 or 141). The appropriate instance execution host can then load application instance 121, transitioning application instance 121 to an executing state. Application instance 121 then continues to execute, such as, for example, processing further messages.

Figure 3:
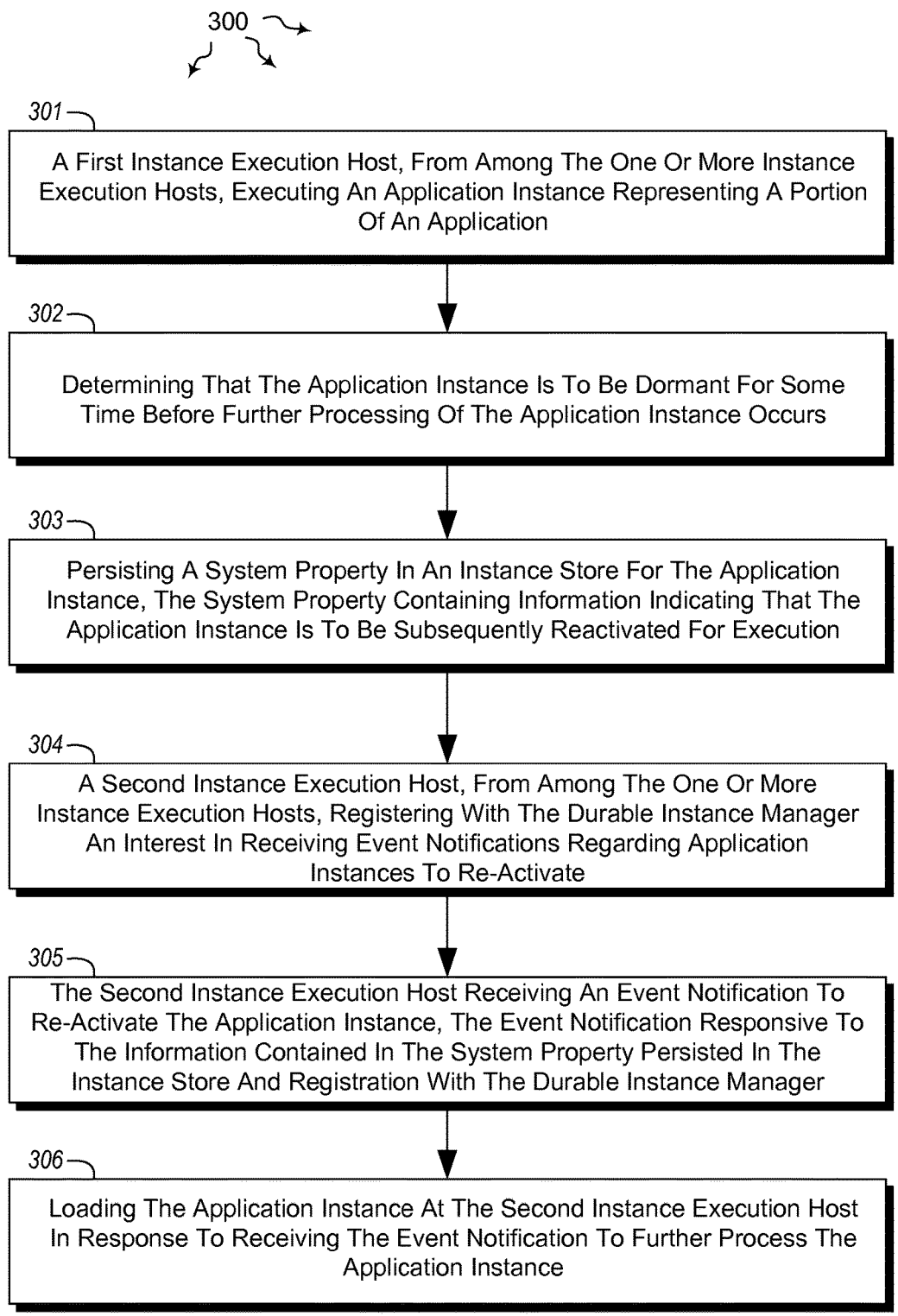
FIG. 3 illustrates a flow chart of an example method for re-activating an instance.

FIG. 3 illustrates a flow chart of an example method 300 for re-activating an instance. Method 300 will be described with respect to the components and data of computer architecture 100.

Method 300 includes an act of a first instance execution host, from among the one or more instance execution hosts, executing an application instance representing a portion of an application (act 301). For example in FIG. 1B, instance execution host 102 can be executing application instance 112. Alternately in FIG. 1C, instance execution host 102 can be executing application instance 121.

Method 300 includes an act of determining that the application instance is to be dormant for some amount of time before further processing of the application instance occurs (act 302). For example in FIG. 1B, instance execution host 102 can detect that application instance 112 is to be idle for some amount of time or that instance execution host 102 is being gracefully shutdown. Alternately in FIG. 1C, durable instance manager 101 can detect a connection between instance execution host 102 and durable instance manager 101 is dropped.

Method 300 includes an act of persisting a system property in an instance store for the application instance, the system property containing information indicating that the application instance is to be subsequently re-activated for execution (act 303). For example in FIG. 1B, instance execution host 102 can assign system property 113 to application instance 112 representing a timer or representing that application instance 112 is in a "Ready To Run" state. Alternately in FIG. 1C, durable instance manager 101 can assign system property 122 to application instance 121 representing that application instance 121 is in a "Ready To Run" state. In either embodiment, durable instance manager 101 can persist the system property (either 113 or 122 respectively) in instance store 103.

When setting a timer or detecting a graceful shutdown, an instance execution host can send a save command to the durable instance manager to persist the application instance along with the system property at the instance store. For example in FIG. 1B, instance execution host 102 can send save 131 to durable instance manager 101 (which subsequently persists application instance 121 and system property 113 in instance store 103, thereby transitioning application instance 112 to a persisted state).

When setting a timer or detecting a graceful shutdown, an instance execution host can remove the application instance from system memory subsequent to persisting the application instance along with the system property at the instance store. For example in FIG. 1B, instance execution host 102 can remove application instance 112 from system memory.

On the other hand, when detecting a dropped connection, a durable instance manager may not receive a save command nor be aware if an application instance is or is not still in system memory at an instance execution host. For example in FIG. 1C, upon detecting a dropped connection to instance application host 102, durable instance manager may not receive a save command from instance execution host 102 nor be aware if application instance 121 is still contained by instance application host 102.

Method 300 includes an act of a second instance execution host, from among the one or more instance execution hosts, registering with the durable instance manager an interest in receiving event notifications regarding application instances to re-activate (act 304). For example in FIG. 1B, a second instance execution host, which may be instance execution host 102 or some other instance execution host, can register with durable instance manager 101 an interest in receiving event notifications regarding application instances (e.g., application instance 112) to re-activate. Alternately in FIG. 1C, instance execution host 102 or instance execution host 141 can register durable instance manager 101 an interest in receiving event notifications regarding application instances (e.g., application instance 121) to re-activate.

Method 300 includes an act of the second instance execution host receiving an event notification to re-activate the application instance, the event notification responsive to the information contained in the system property persisted in the instance store and registration with the durable instance manager (act 305). For example in FIG. 1B, a second instance execution host, which may be instance execution host 102 or some other instance execution host, can receive activation events in preparation for loading application instance 112. The activation events are responsive to information contained in system property 113 and the second execution host having registered for event notifications.

Alternately in FIG. 1C, instance execution host 102 can receive activation events 152 or instance execution host 141 can receive activation events 153 in preparation for loading application instance 121. Activation events 152 or 153 are responsive to information contained in system property 122 and instance execution host 102 or 141 having registered for event notifications. Activation events can represent one or more levels of activation as depicted in sequence diagram 200.

Method 300 includes an act of loading the application instance at the second instance execution host in response to receiving the event notification to further process the application instance (act 306). For example in FIG. 1B, instance execution host 102 or some other instance execution host can receive load 132 to load application instance 112 in response to being activated to receive application instance 112. Alternately in FIG. 1C, instance execution host 102 or instance execution host 141 can receive load 134 to load application instance 121 in response to being activated to receive application instance 121.

Figure 4:
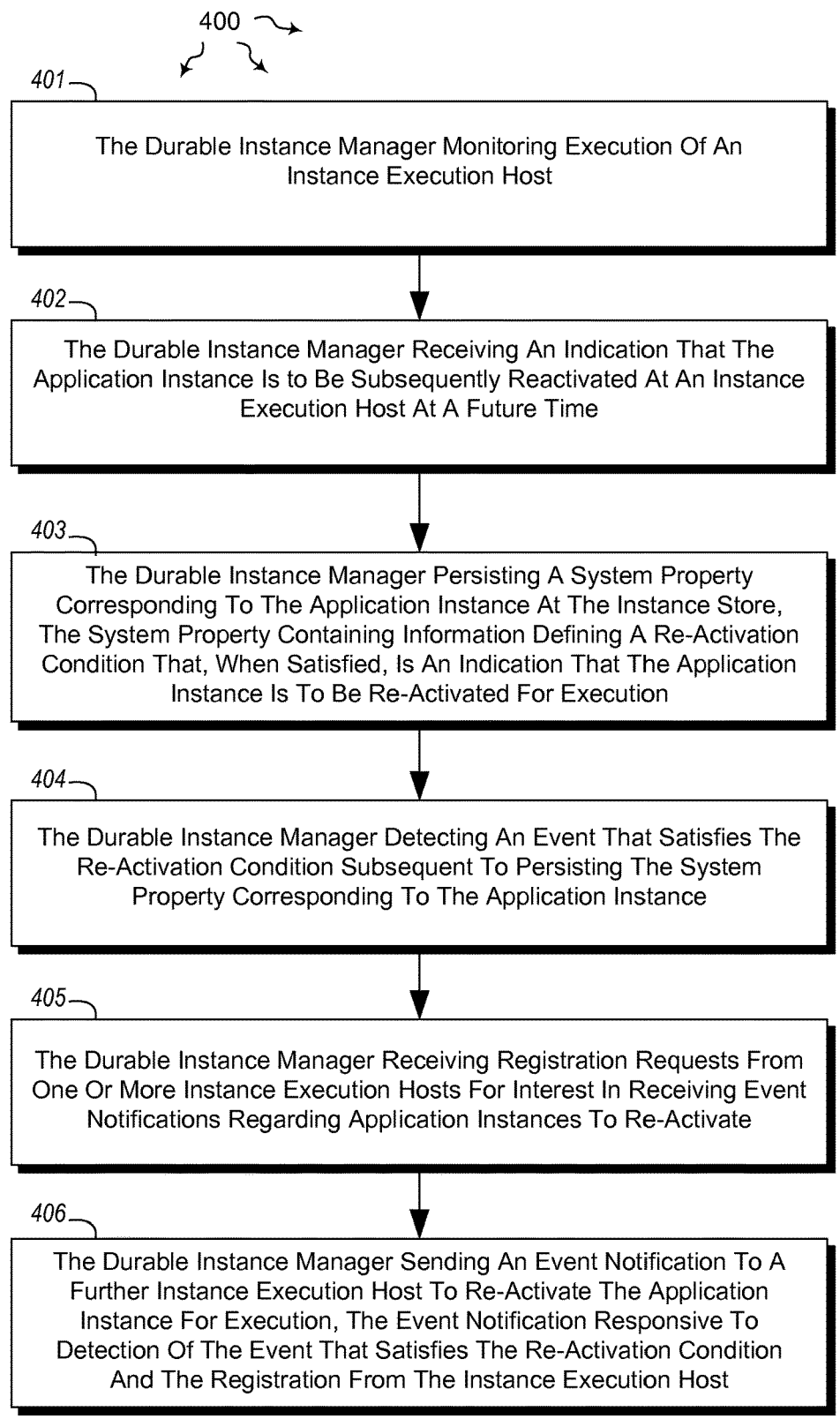
FIG. 4 illustrates a flow chart of an example method for re-activating an instance.

FIG. 4 illustrates a flow chart of an example method 400 for re-activating an instance. Method 400 will be described with respect to the components and data of computer architecture 100.

Method 400 includes an act of durable instance manager monitoring execution of an application instance at an instance execution host (act 401). For example in FIG. 1B, durable instance manager 101 can monitor execution of application instance 112 at instance execution host 102. Alternately in FIG. 1C, durable instance manager 101 can monitor execution of application instance 121 at instance execution host 102.

Method 400 includes an act of the durable instance manager receiving an indication that the application instance is to be subsequently re-activated at an instance execution host at a future time (act 402). For example in FIG. 1B, durable instance manager 101 can receive save 131 including application instance 112 and system property 113. System property 113 can represent a timer or that application instance 112 is in a "Ready To Run" state. Alternately in FIG. 1C, durable instance manager 101 can detect that a connection between instance execution host 102 and durable instance manage 101 is dropped.

Method 400 includes an act of the durable instance manager persisting a system property corresponding to the application instance at the instance store, the system property containing information defining a re-activation condition that, when satisfied, is an indication that the application instance is to be re-activated for execution (act 403). For example in FIG. 1B, durable instance manager 101 can persist system property 113 in instance store 103. Property 113 can define a wake up time that when reached satisfies the re-activation condition. Alternately, property 113 can define that the re-activation condition is detecting that application instance 112 is in a persistent but "Ready To Run" state.

Alternately in FIG. 1C, durable instance manager 101 can persist system property 122 in instance store 103. Property 122 can define that the re-activation condition is detecting that application instance 121 is in a persistent but "Ready To Run" state.

Method 400 includes an act of the durable instance manager detecting an event that satisfies the re-activation condition subsequent to persisting the system property corresponding to the application instance (act 404). For example in FIG. 1B, durable instance manager 101 can detect a defined wake up time or that instance 112 is in a persisted but "Ready To Run" state subsequent to persisting system property 113. Alternately in FIG. 1C, durable instance manager 101 can detect instance 121 is in a persisted but "Ready To Run" state subsequent to persisting system property 122.

Method 400 includes an act of the durable instance manager receiving registration requests from one or more instance execution hosts for interest in receiving event notifications regarding application instances to re-activate (act 405). For example in FIG. 1B, durable instance manager 101 can receive a registration request from instance execution host 102 and/or from other instance execution hosts for interest in receiving event notifications regarding application instances (e.g., application instance 112) to re-activate. Alternately in FIG. 1C, durable instance manager 101 can receive a registration request from instance execution host 101 and/or instance execution host 141 for interest in receiving event notifications regarding application instances (e.g., application instance 121) to re-activate.

Method 400 includes an act of the durable instance manager sending an event notification to a further instance execution host to re-activate the application instance for execution, the event notification responsive to detection of the event that satisfies the re-activation condition and the registration from the instance execution host (act 406). For example in FIG. 1B, durable instance manager 101 can send activation events to instance execution host 102 or some other instance execution host in response to detecting a defined wake up time or that application instance 112 is in a persisted but "Ready To Run" state and that instance execution host 102 or some other instance registered for event notifications. Alternately in FIG. 1C, durable instance manager 101 can send activation events 152 to instance execution host 102 or send activation events 153 to instance execution host 141 in response to detecting that application instance 121 is in a persisted but "Ready To Run" state and that instance execution host 102 or 141 some registered for event notifications.

Accordingly, embodiments of the invention facilitate increased reliability through the use of persistence. Further, since the loading and unloading of instances is monitored and controlled, a system can scale in terms of the amount of work it can handle on a particular hardware configuration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system comprising memory operatively coupled to one or more processors, the memory storing instructions that perform a method of:

receiving, from a first instance execution host, a request to persist an application instance;

identifying a system property to re-activate the application instance, the system property comprising a timer;

tracking a state of the application instance from executing to persisted;

persisting the application instance for a duration of the timer;

determining, based on an expiration of the timer, that the application instance is to be running, wherein the expiration of the timer indicates the application instance is to be transitioned back to an executing state;

sending, based on the determination, an activation event to a second instance execution host to cause the second instance execution host to execute the application instance; and tracking the state of the application instance from persisted to executing.

2. The system of claim 1, wherein the application instance represents a portion of an application.

3. The system of claim 1, further comprising:

prior to persisting the application instance, the first execution host being gracefully shutdown.

4. The system of claim 1, further comprising:

receiving a load command to execute the application instance.

5. The system of claim 1, wherein the first execution host and the second execution host are communicatively connected via a network.

6. The system of claim 1, wherein the network is the Internet.

7. A computer readable storage device storing instructions that, when executed, are capable of performing a method of:

receiving, from a first instance execution host, a request to persist an application instance;

identifying a system property to re-activate the application instance, the system property comprising a timer;

tracking the state of the application instance from executing to persisted;

persisting the application instance for a duration of the timer;

determining, based on an expiration of the timer, that the application instance is to be, wherein the expiration of the timer indicates the application instance is to be transitioned back to an executing state;

sending, based on the determination, an activation event to a second instance execution host to cause the second instance execution host to execute the application instance; and tracking the state of the application instance from persisted to executing.

8. The computer readable storage device of claim 7, wherein the application instance represents a portion of an application.

9. The computer readable storage device of claim 7, further comprising:
   prior to persisting the application instance, the first execution host being gracefully shutdown.

10. The computer readable storage device of claim 7, further comprising: receiving a load command to execute the application instance.

11. The computer readable storage device of claim 7, wherein the first execution host and the second execution host are communicatively connected via a network.

12. The computer readable storage device of claim 7, wherein the network is the Internet.

13. A computer implemented method comprising:
   receiving, from a first instance execution host, a request to persist an application instance, the request indicative of a graceful shutdown;
   identifying a system property to re-activate the application instance, the system property comprising a timer;
   tracking the state of the application instance from executing to persisted;
   persisting the application instance for a duration of the timer;
   determining, based on an expiration of the timer, that the application instance is to be running, wherein the expiration of the timer indicates the application instance is to be transitioned back to an executing state;
   sending, based on the determination, an activation event to a second instance execution host to cause the second instance execution host to execute the application instance; and
   tracking the state of the application instance from persisted to executing.

14. The computer implemented of claim 13, wherein the application instance represents a portion of an application.

15. The computer implemented of claim 13, further comprising:
   prior to persisting the application instance, the first execution host being gracefully shutdown.

16. The computer implemented of claim 13, further comprising:
   receiving a load command to execute the application instance.

17. The computer implemented of claim 13, wherein the first execution host and the second execution host are communicatively connected via a network.

18. The system of claim 1, wherein the timer is a specified wake up time.

19. The computer readable storage device of claim 7, wherein the timer is a specified wake up time.

20. The method of claim 13, wherein the wherein the timer is a specified wake up time.

21. The system of claim 1, wherein identifying comprises scanning a database to identify the system property.

* * * * *